(12) United States Patent
Petersen

(10) Patent No.: US 11,116,334 B2
(45) Date of Patent: Sep. 14, 2021

(54) MOUNTING BRACKET FOR WALL MOUNTED ITEMS

(71) Applicant: Schwaab, Inc., Brookfield, WI (US)

(72) Inventor: Craig Petersen, Park Ridge, IL (US)

(73) Assignee: Schwaab, Inc., Brookfield, WI (US)

( * ) Notice: Subject to any disclaimer, the term of this patent is extended or adjusted under 35 U.S.C. 154(b) by 9 days.

(21) Appl. No.: 16/741,075

(22) Filed: Jan. 13, 2020

(65) Prior Publication Data

US 2020/0237118 A1 Jul. 30, 2020

Related U.S. Application Data

(60) Provisional application No. 62/796,192, filed on Jan. 24, 2019.

(51) Int. Cl.
*A47F 5/08* (2006.01)
*F16M 13/02* (2006.01)
*F16M 11/04* (2006.01)

(52) U.S. Cl.
CPC ........... *A47F 5/0846* (2013.01); *F16M 13/02* (2013.01); *F16M 11/04* (2013.01)

(58) Field of Classification Search
CPC ........ A47F 5/0846; A47F 5/0807; A47F 5/08; F16M 13/02; F16M 11/04; G09F 2007/1852; G09F 2007/1843; G09F 2003/0222; Y10T 156/1189; B32B 38/10; B32B 43/006
USPC ...... 248/683, 686, 444.1, 447.1, 467, 475.1, 248/489, 497, 205.3, 317, 220.41; 40/570, 607.13; 156/718, 247, 701, 709, 156/715, 761–763
See application file for complete search history.

(56) References Cited

U.S. PATENT DOCUMENTS

| | | | | |
|---|---|---|---|---|
| 5,388,357 A * | 2/1995 | Malita | ..................... | G09F 13/04 362/812 |
| 5,507,464 A * | 4/1996 | Hamerski | .............. | A47G 1/175 248/205.3 |
| 5,921,514 A * | 7/1999 | Schumann | ............ | F16B 47/003 248/205.3 |
| 6,136,397 A * | 10/2000 | Luhmann | ................ | A47G 1/175 248/467 |
| 6,187,404 B1 * | 2/2001 | Schumann | .............. | A47G 1/175 248/205.3 |
| 6,240,665 B1 * | 6/2001 | Brown | .................... | G09F 13/04 40/570 |
| 6,283,434 B1 * | 9/2001 | Holder | ................... | A47G 1/205 248/489 |

(Continued)

*Primary Examiner* — Christopher Garft
*Assistant Examiner* — Michael McDuffie
(74) *Attorney, Agent, or Firm* — Knechtel, Demeur & Samlan

(57) ABSTRACT

A mounting bracket for releasably mounting an article such as a sign or picture frame to a substantially flat surface such as a wall. The bracket has an adhesive disc securely attached to one side of the bracket and the opposite side of the adhesive disc has a releasable adhesive face for attaching to the wall. A tool inserted into the mounting bracket applies a rotative force to the mounting bracket for applying a shear force to the releasable adhesive face which causes the adhesive face to release from the wall. The mounting bracket is releasably mounted to a sign, which allows easy installation and removal of the sign from the wall.

9 Claims, 5 Drawing Sheets

(56) References Cited

U.S. PATENT DOCUMENTS

| | | | | |
|---|---|---|---|---|
| 6,824,295 | B1* | 11/2004 | Grondal | G09F 13/14 |
| | | | | 362/234 |
| 6,832,445 | B2* | 12/2004 | Pitzen | A47G 1/175 |
| | | | | 40/594 |
| 7,055,360 | B2* | 6/2006 | Hamerski | B25B 11/00 |
| | | | | 72/379.2 |
| 8,757,570 | B2* | 6/2014 | Ernst | A47G 25/0607 |
| | | | | 248/304 |
| 8,814,112 | B2* | 8/2014 | Thompson | A47G 1/175 |
| | | | | 248/205.3 |
| 10,221,883 | B2* | 3/2019 | Demsky | F16M 13/022 |
| 10,925,417 | B2* | 2/2021 | Sato | A47G 1/17 |
| 2006/0024144 | A1* | 2/2006 | Horvath | F16B 13/002 |
| | | | | 411/30 |
| 2006/0080873 | A1* | 4/2006 | Riopel | G02B 6/005 |
| | | | | 40/546 |
| 2009/0244836 | A1* | 10/2009 | Leng | G06F 1/1616 |
| | | | | 361/679.58 |
| 2009/0266966 | A1* | 10/2009 | Sample | G03B 21/28 |
| | | | | 248/467 |
| 2012/0145847 | A1* | 6/2012 | Wang | A47G 1/17 |
| | | | | 248/205.3 |
| 2012/0174448 | A1* | 7/2012 | Lee | F21V 33/0076 |
| | | | | 40/570 |
| 2014/0178619 | A1* | 6/2014 | Niiyama | B32B 37/12 |
| | | | | 428/40.1 |
| 2014/0217251 | A1* | 8/2014 | Cheng | F16M 13/02 |
| | | | | 248/205.3 |
| 2014/0306076 | A1* | 10/2014 | Friesch | A47G 33/105 |
| | | | | 248/205.3 |
| 2015/0173534 | A1* | 6/2015 | Antoniou | A47G 1/12 |
| | | | | 248/467 |
| 2018/0324337 | A1* | 11/2018 | Yoshikawa | G02B 7/021 |
| 2019/0329536 | A1* | 10/2019 | Niimi | C09J 7/24 |

\* cited by examiner

MOUNTING BRACKET FOR WALL MOUNTED ITEMS

CROSS-REFERENCE TO RELATED APPLICATIONS

This application is based on and claims priority of provisional patent application 62/796,192 filed Jan. 24, 2019.

BACKGROUND AND SUMMARY OF THE INVENTION

This invention relates to a unique bracket and system for mounting wall signs, photographs, posters, and other items of the type that are often found in offices, retail establishments, commercial establishments, factories and homes.

One embodiment of the present invention is designed for mounting wall signs. Wall signs are generally made to be permanently or semi-permanently affixed to a wall or door. Adhesives, nails, screws, hooks or other fasteners are commonly used. One method of mounting is to affix the sign to the wall by means of screws or nails that pass through the sign plate into the wall. In order to remove the sign, the screws or nails must be removed from the wall making removal difficult. Another problem with this method is that it damages the wall by leaving holes Where the screw or nail was inserted into the wall. Another method is to affix a hook to the wall and then hang the sign from the hook. The problem with this method is that the sign can be easily removed by anyone, even by unauthorized persons. This presents security issues due to the ease with which the sign can be removed, whereas Applicant's invention provides a more secure sign as compared to merely hanging a sign from a hook. Still another method of mounting the sign to the wall is to use adhesive. Depending on the adhesive used, the sign may he so easily removed from the adhesive that it falls off the wall, or if the adhesive is so strong, the sign may be permanently affixed to the wall and only by removing a thin layer of the wall or paint, can the sign be removed.

Another embodiment of this invention is designed to mount picture frames to a wall or other vertical surface. The same problems are encountered with mounting a picture frame as described above in mounting a sign. Generally, the means to mount picture frames is to use hooks, nails or adhesives, none of which adequately solve the problems discussed above.

Applicant's invention solves the problems stated above by utilizing a unique mounting bracket that can be used to mount signs, picture frames, hooks or other items on a wall, door or other substantially flat surface. Applicant's inventive mounting bracket allows the bracket and frame to be easily removed leaving no residue on the wall and no damage the wall.

Thus, it is an object of this invention to provide a bracket that can mount various objects such as a sign, picture frame, or hook to a wall, yet easily be removed leaving no damage to or residue on the wall.

Applicant has solved this problem by providing one or more mounting brackets which are affixed to the wall by means of an adhesive wafer. The adhesive wafer is of the type commonly known in the industry and various configurations of products using this adhesive are sold by 3M Company under the trademark "COMMAND". These adhesive fasteners securely adhere to a wall and are removed by applying a shear force to the adhesive fastener by means of pulling vertically on the adhesive fastener when the fastener is secured to a wall. This stretches the adhesive fastener until the shear force is sufficient to release the fastener from the wall. The fastener is released from the wall without damaging the wall surface. However, if a tensile force, perpendicular to the wall, is applied to the adhesive fastener, the adhesive fastener does not easily release until a great force is applied to the fastener sufficient to pull the fastener from the wall which generally means removing a portion of the wall surface along with the adhesive fastener. There is an advantage and disadvantage to using these adhesive fasteners. If properly removed, they are easy to remove and do not damage the wall surface. However, if the user does not properly apply a shear force to the fasteners to remove them from a wall, and instead apply a tensile force, damage to the wall surface certainly results. These adhesive fasteners can be made in any one of a number of configurations, such as rectangles, squares and circles.

Applicant's mounting bracket is designed to be mounted on the wall by means of releasable adhesive fasteners such as those of the 3M Company COMMAND type. The adhesive fastener is attached to the mounting bracket. The mounting bracket is received in a complimentary recess in the sign, picture frame, hook, or other item to be mounted on the wall. The mounting bracket has a slot to receive a flat instrument such as screwdriver to apply a shear force to the adhesive fastener to release it from the wall. Although in the first embodiment is directed to mounting a sign, and a second embodiment is directed to a picture frame, it is understood that the mounting brackets in this application can be used to mount signs, picture frames, posters, hooks, or any other item that is desired to be attached to a vertical surface such as a wall.

DESCRIPTION OF THE PREFERRED EMBODIMENT

Figure 1:
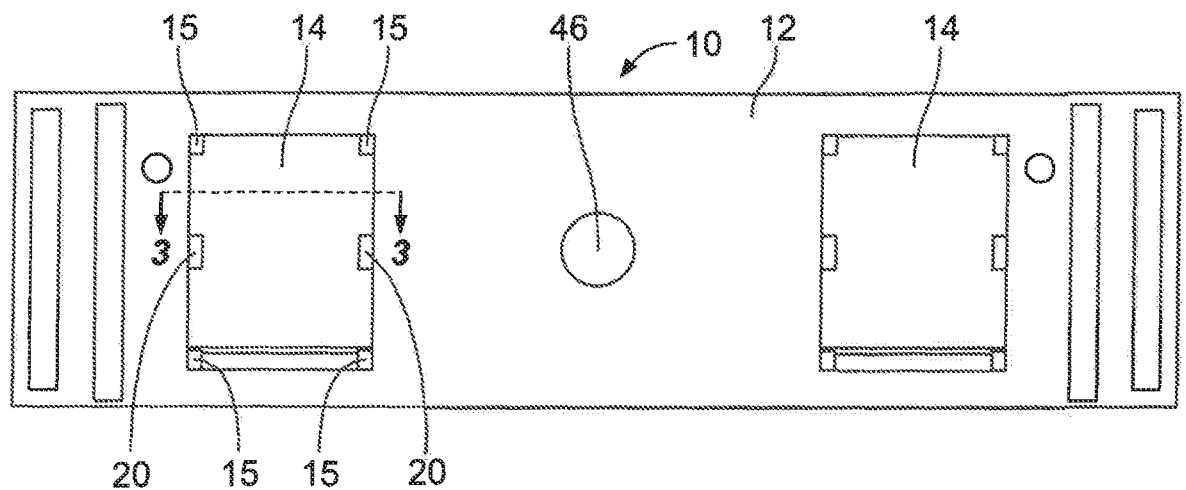
FIG. 1 is a rear view of the sign frame with the mounting brackets removed.
Figure 2:
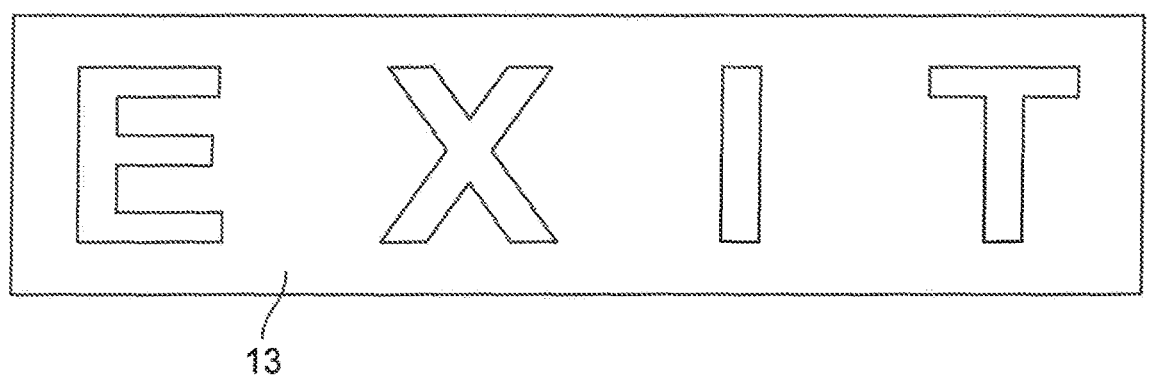
FIG. 2 is a front view of the sign insert to convey information.
Figure 3:
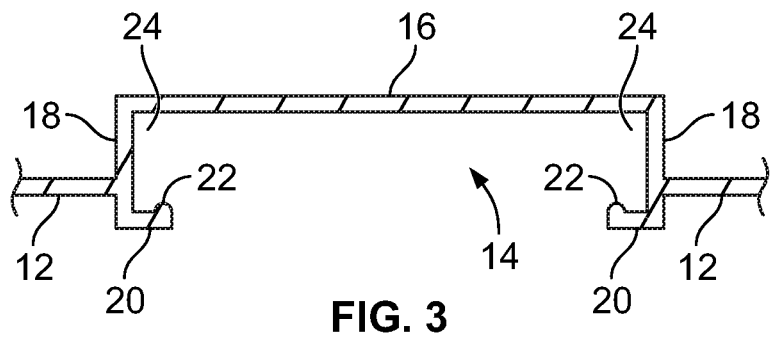
FIG. 3 is a cross section view taken along lines 2-2 of FIG. 1.

Turning first to FIG. 1, there is illustrated the rear view of a wall sign 10. Throughout this application, the reference to a "wall sign" is meant to include a wall sign, picture frame, wall mounted hook or fastener, or other similar objects that are intended to be releasably attached to a wall or similar substantially flat surface. There is a sign frame 12 having a pair of opposite recessed portions 14 on either end of the sign frame 12. There are tabs 15 in the corners of the recessed portion 14 the function of which will be described herein later. The sign frame receives a sign insert 13 (FIG. 2) containing the information to be conveyed to the observer. The sign insert 13 can be paper, cardboard, plastic or other material that serves the purpose for which it is intended such as providing information to the observer. As seen in FIG. 3, the recessed portion 14 has a back wall 16 and side walls 18. A pair of legs 20 at a free end of the side walls 18 extend inward from the side walls 18. At the ends of the legs 20 are small upstanding pins 22 that protrude inward from the surface of the legs 20 and extend into the recess 14. The legs 20 and the back wall 16 define a channel 24.

There are mounting brackets 30 which are clearly illustrated in FIGS. 4-8. As see in FIG. 8, the mounting brackets 30 have a frame or base structure 31 that has a flat front face 32 and a flat rear face 34. Affixed to the rear surface 34 is an adhesive wafer 36. The adhesive wafer 36 has a front face that has a releasable adhesive like the 3M Command adhesive products. The front face is covered with a releasable cover sheet when removed, exposes the adhesive surface. The rear face of the adhesive wafer is permanently adhesively affixed to the flat rear face 34 of the mounting bracket 30. The adhesive wafer 36 is made from a polyethylene foam that has the rear face having a permanent adhesive and the front face having the releasable adhesive. The polyethylene foam with these adhesives is available in the open market with several suppliers able to supply the foam having these adhesive characteristics. Also as seen in FIGS. 4-8 there are a pair of arms 38 extending outward from both sides of the mounting brackets 30.

Figure 4:
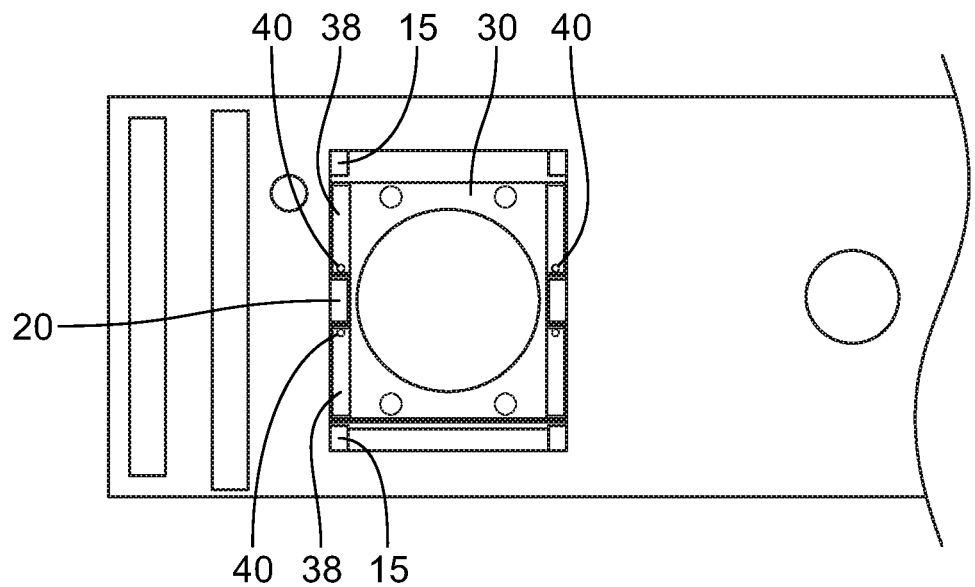
FIG. 4 is a rear view of the sign frame with the right portion removed with the mounting bracket inserted into a recess in the rear of the sign frame with the bracket in the unlocked position.
Figure 5:
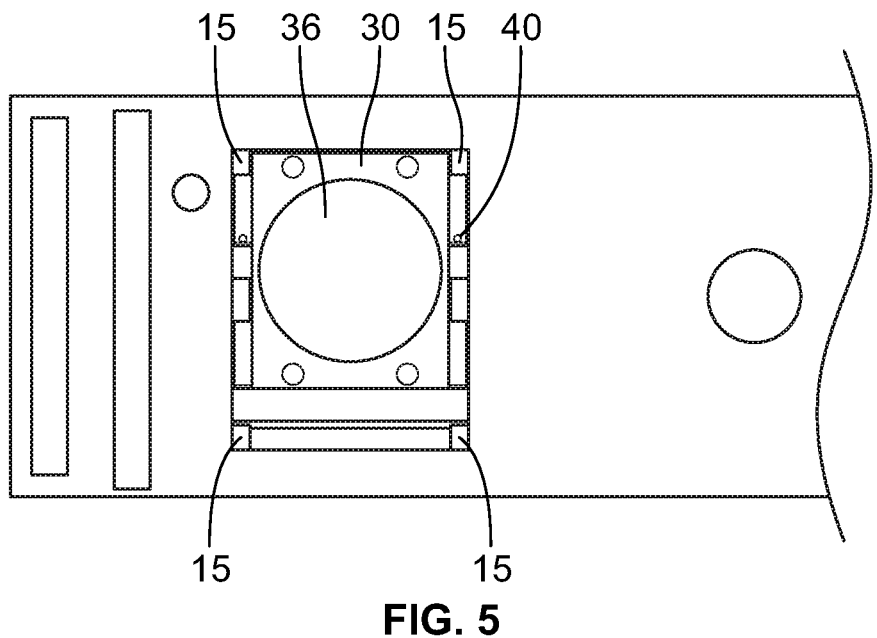
FIG. 5 is a rear view of the sign frame similar to FIG. 4 except with the mounting bracket in the locked position.

In use, the mounting brackets 30 are inserted into the recessed portions 14 in the sign frame 12 with the flat front face 32 placed against the back wall 16 as seen in FIG. 4. The mounting brackets 30 are then pushed upward into the locked position as seen in FIG. 5. The pins 22 engage recesses 40 on the arms 38 so that the pins 22 are releasably retained in the recesses 40. This give the user a tactile indication that the mounting brackets are correctly positioned in the sign frame when in the "latched" position. It also gives an audible "click" that the mounting brackets are correctly inserted into the latched position. The arms 38 are also closely received between the tabs 15 and legs 20 and the back wall 16 to provide a frictional engagement between these parts to assist in securely holding the mounting brackets in the latched position.

The releasable cover sheet that is over the front face of the adhesive wafer 36 is removed to expose the adhesive surface. The sign frame 12 with the exposed releasable adhesive surface is then pushed against the wall to attach the frame 12 to the wall. The sign insert 13 that has the desired information on it is inserted into a border 41 (FIG. 10) on the face of the sign frame 12 in a normal manner. Other similar means to insert or attach the sign insert that are known in the art can be used.

Figure 6:
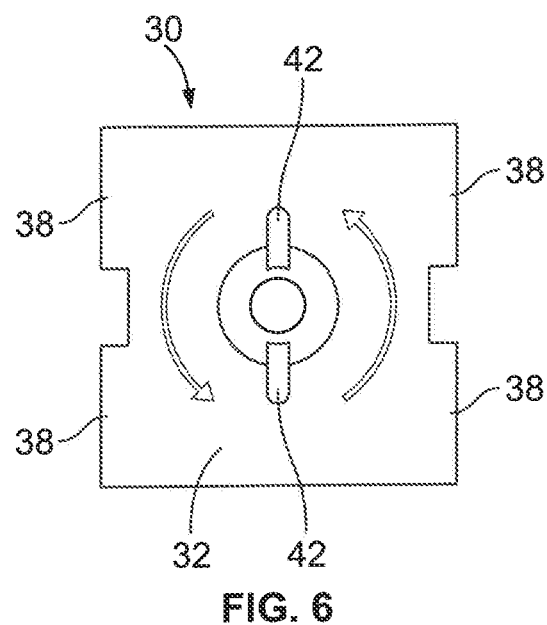
FIG. 6 is a front view of the mounting bracket positioned as it would be placed against a wall.
Figure 7:
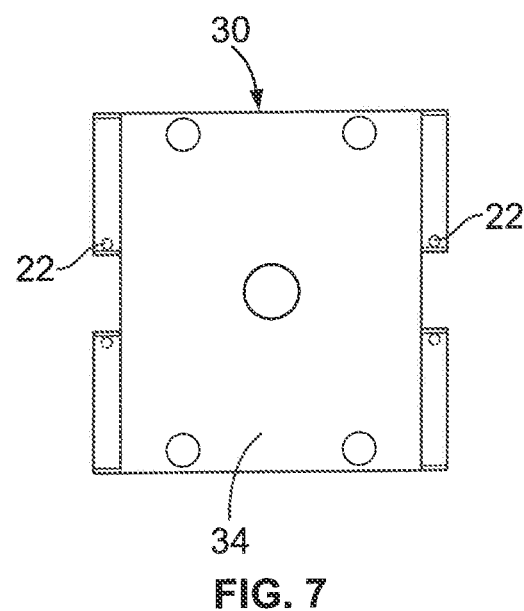
FIG. 7 is a rear view of the mounting bracket of FIG. 6 with the adhesive wafer removed.
Figure 8:
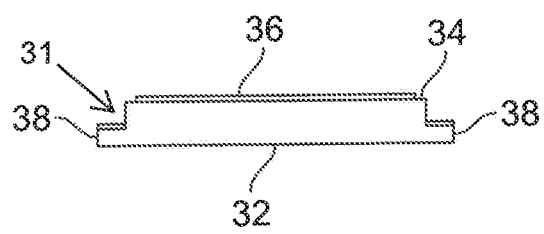
FIG. 8 is a top view of the mounting bracket.
Figure 9:
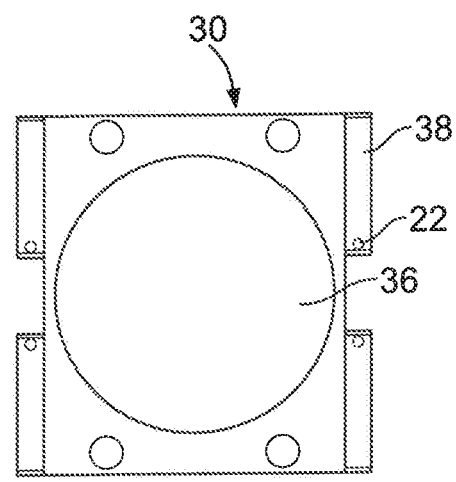
FIG. 9 is a rear view of the mounting bracket showing the adhesive wafer.

In order to remove the sign frame 12 from the wall, the sign frame 12 is pushed vertically upward. This releases the pins 22 from the recesses 40, and the arms 38 from the tabs 15 and legs 20 so that the sign frame 12 can be removed from the brackets 30. A tool such as a screwdriver or a large coin is inserted into slots 42 in the mounting bracket (FIG. 6). Other tools that can be received in the mounting bracket can be used provided that they can be rotated to impart a shear force to the mounting bracket 30. A rotative motion is imparted to the tool. This imparts a shear force to the adhesive wafer 36 and to the rear face 34 and the releasable adhesive surface which releases the adhesive wafer 36 from the wall without leaving any residue or damaging the wall. The application of a shear force is critical for releasing the adhesive wafer from the wall without damaging the wall surface. In an alternate embodiment, the slots 42 are replaced with a pair of opposite holes that receive a tool having protrusions that engage the opposite holes so that a rotating motion can be imparted to the mounting bracket 30. Other configurations that can replace the slots 42 that can provide a means to apply a shear force to the releasable adhesive surface can include a various geometric shapes such as hexagonal or square inserts that use a nut driver to impart the rotational force. In all other respects the tools operate in the same manner.

Figure 10:
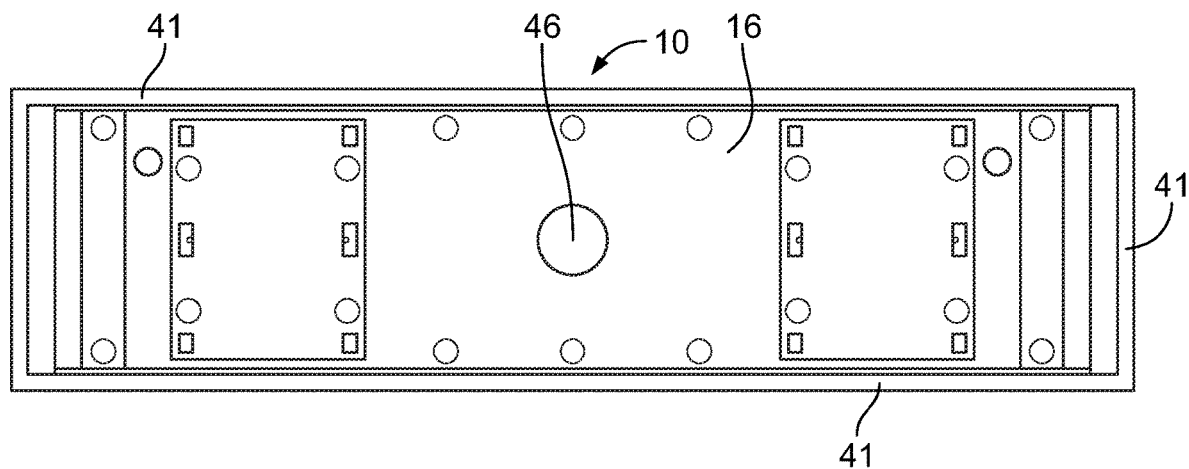
FIG. 10 is a front view of the sign frame with the sign insert removed.

FIG. 10 shows a hole 46 in the center of the sign frame 12. When the sign frame 12 is removed from the brackets 30, and a sign insert 13 is mounted in the sign frame border 41, a pencil or similar thin object is pushed through the hole 46 to remove the sign insert 13. This releases the sign insert 13 allowing a replacement sign insert 13 to be inserted. This allows quick, easy, and economical replacement of sign inserts.

Figure 11:
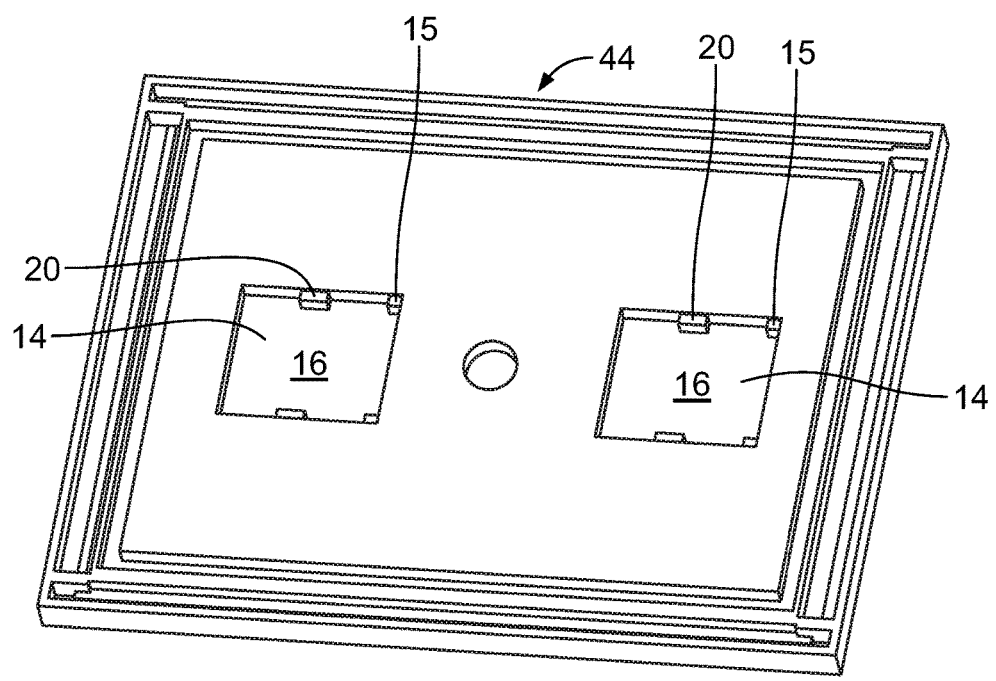
FIG. 11 is a rear view of an alternate embodiment of a picture frame with the mounting brackets removed.
Figure 12:
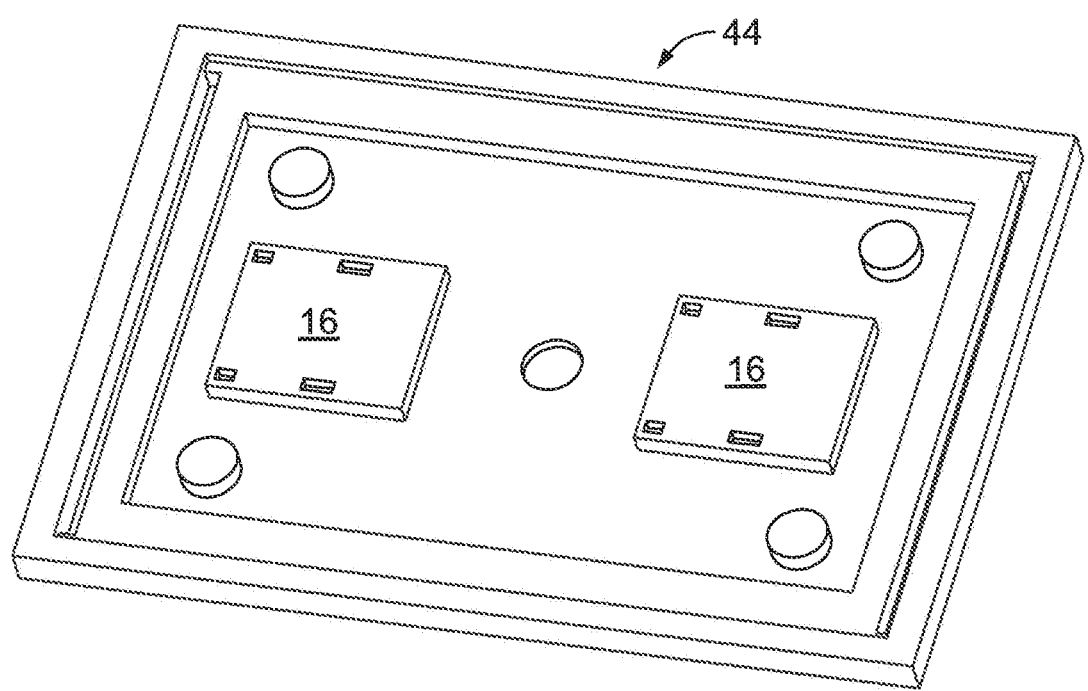
FIG. 12 is a front view of the picture frame of FIG. 11 with the picture removed for clarity.

FIGS. 11 and 12 depict an alternate embodiment of a picture frame 44 which utilizes the inventive brackets 30. The picture frame 44 has a recessed portion 14, tabs 15, and legs 20 as described in the first embodiment. The recessed portion 44 receives the mounting bracket 30 which has the adhesive wafer 36 attached to it. In all other respects the picture frame is mounted to a wall just as the wall sign 10 was mounted. Similarly, it is released in the same manner.

In another embodiment, a hook can be manufactured with a rear surface that has a recessed portion 14 that receives a mounting bracket 30 as disclosed in this application. The hook is attached to the mounting bracket 30 which in turn is attached to the wall.

Various other items of varying designs and configurations can be mounted to a wall or flat surface utilizing the inventive bracket. The bracket must still be received in a complementary recessed portion in the rear of the item.

Thus, there has been provided a mounting bracket for signs and other similar items that solves the problems of the prior devices. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A combination mounting bracket and sign in which the mounting bracket is releasably mounted to a substantially flat surface comprising:

a mounting bracket frame having a substantially flat front surface, a substantially flat rear surface, and a thickness;

an adhesive member having two sides, a first side securely attached to the rear surface of the mounting bracket frame and the second side having a releasable adhesive face for attaching to a wall, means on the front face of the frame for receiving a tool for imparting a rotative force to the mounting bracket frame for applying a shear force to the releasable adhesive face, the shear force causing the adhesive face to release from the wall;

a pair of outstanding arms on the mounting bracket frame for attaching the mounting bracket frame to a sign that is to be mounted on the wall;

the sign having a sign front face and a sign rear face;

the sign rear face having a recessed portion dimensioned to receive the mounting bracket frame;

at least two channels within the recessed portion, one of the channels adapted for receiving one of the pair of outstanding arms and the other channel adapted for receiving the other of the outstanding arms.

2. The combination mounting bracket and sign of claim 1, and further comprising a recess on the outstanding arms.

3. The combination mounting bracket and sign of claim 1, wherein each of the two channels are comprised of a back wall, side walls, and legs, with an outstanding pin on. each leg for engaging a complementary recess on each of the outstanding arms.

4. The combination mounting bracket and sign of claim 2, wherein the mounting bracket is received in the recess and not within the channels in a first unlatched position and the outstanding arms on the mounting bracket are moved within the channels to a second latched position wherein the outstanding arms are within the channels.

5. The combination mounting bracket and sign of claim 4, wherein the outstanding pin on each leg engages the complementary recess on the outstanding arm when in the second latched position.

6. The combination mounting bracket and sign of claim 1 and further comprising at least two recessed portions in the sign rear face, each of the recessed portions dimensioned to receive a the mounting bracket frame.

7. The combination mounting bracket and sign of claim 1 and further comprising attaching means on the sign front face for receiving a sign insert for displaying printed indicia.

8. A method of mounting a releasable sign bracket and sign comprising the following steps:

a. providing a mounting bracket frame having a substantially flat front surface, a substantially flat rear surface, and a thickness, with an adhesive member having a first side securely attached to the rear surface of the mounting bracket frame and a second side having a releasable adhesive face, a tool receiving receptacle on the front face of the mounting bracket frame for receiving a tool for imparting a rotative force to the mounting bracket frame, a pair of outstanding arms on the mounting bracket frame for attaching the mounting bracket frame to a sign;

b. providing a sign having a sign front face and a sign rear face, the sign rear face having a recessed portion dimensioned to receive the mounting bracket frame, at least two channels within the recessed portion;

c. inserting one of the outstanding arms on the mounting bracket frame into one of the channels and the other of the outstanding arms into the other channel, d. sliding the sign downward causing the outstanding arms to slide into a latched position in the channels;

e. applying a force to the sign for engaging the second side of the adhesive member with the releasable adhesive face to a wall for attaching the sign to the wall.

9. The method of claim 8 and the additional steps of removing the sign comprising:

f. lifting the sign from the mounting bracket frame for removing the sign and exposing the front face of the mounting bracket;

g. inserting a tool into the tool receiving receptacle and rotating the tool for applying a shear force to the mounting bracket frame and the adhesive member;

h. causing the releasable adhesive face to release from the wall due to the shear force.

\* \* \* \* \*